United States Patent
Goodman et al.

(10) Patent No.: US 9,035,993 B2
(45) Date of Patent: May 19, 2015

(54) METHOD AND SYSTEM FOR BYPASSING AN ANCHOR POINT

(75) Inventors: Lee N. Goodman, Tyngsboro, MA (US); Elliot G. Eichen, Arlington, MA (US); James Flynn, Stoughton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 197 days.

(21) Appl. No.: 13/565,239

(22) Filed: Aug. 2, 2012

(65) Prior Publication Data

US 2014/0036028 A1 Feb. 6, 2014

(51) Int. Cl.
*H04N 7/14* (2006.01)
(52) U.S. Cl.
CPC ...................................... *H04N 7/14* (2013.01)

(58) Field of Classification Search
CPC ......... H04N 7/14; H04N 7/141; H04N 7/142; H04N 7/147; H04N 7/15; H04N 7/152; H04L 63/00; H04L 63/30; H04L 65/1082; H04M 2/008; H04M 3/2281
USPC .................. 348/14.01–14.16; 379/213.01
See application file for complete search history.

(56) References Cited

U.S. PATENT DOCUMENTS

| | | | | |
|---|---|---|---|---|
| 5,844,600 A * | 12/1998 | Kerr | ............................ | 348/14.12 |
| 8,149,264 B2 * | 4/2012 | Franceschini et al. | ..... | 348/14.12 |
| 8,571,189 B2 * | 10/2013 | Yuan et al. | ................. | 379/93.08 |
| 2009/0141883 A1 * | 6/2009 | Bastien | .................... | 379/213.01 |
| 2014/0003450 A1 * | 1/2014 | Bentley et al. | ................ | 370/468 |

* cited by examiner

*Primary Examiner* — Melur Ramakrishnaiah (57) ABSTRACT

An approach for splitting a communication data stream into an audio data stream and a video data stream, anchoring the audio data stream at an anchor point within a network, and bypassing anchoring of the video data stream at the anchor point within the network to reduce a processing load at the anchor point.

20 Claims, 8 Drawing Sheets

METHOD AND SYSTEM FOR BYPASSING AN ANCHOR POINT

BACKGROUND INFORMATION

The popularity and convenience of the Internet has resulted in the reinvention of traditional telephony services. These services are offered over a packet switched network with minimal or no cost to the users. IP (Internet Protocol) telephony, thus, have found significant success, particularly in the long distance market. In general, IP telephony, which is also referred to as Voice-over-IP (VOIP), is the conversion of voice information into data packets that are transmitted over an IP network. Communication service providers often have requirements regarding anchoring media within a network. For example, communication service provider must comply with certain regulatory requirements when providing communication services. One such requirement is the Communications Assistance for Law Enforcement Act (CALEA). Under CALEA, a service provider must provide for the ability for government agencies to selectively monitor communications. When a request to monitor a particular communication data stream is received, the anchored stream can be accessed without the knowledge of the participants. However, with the popularity of more complex forms of communications, e.g., video conferencing communications, conventional approaches to anchoring communications are inadequate.

Based on the foregoing, there is a need for an approach to anchor communication data streams, particularly those involving a video data stream.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for bypassing a video data stream around an anchor point are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
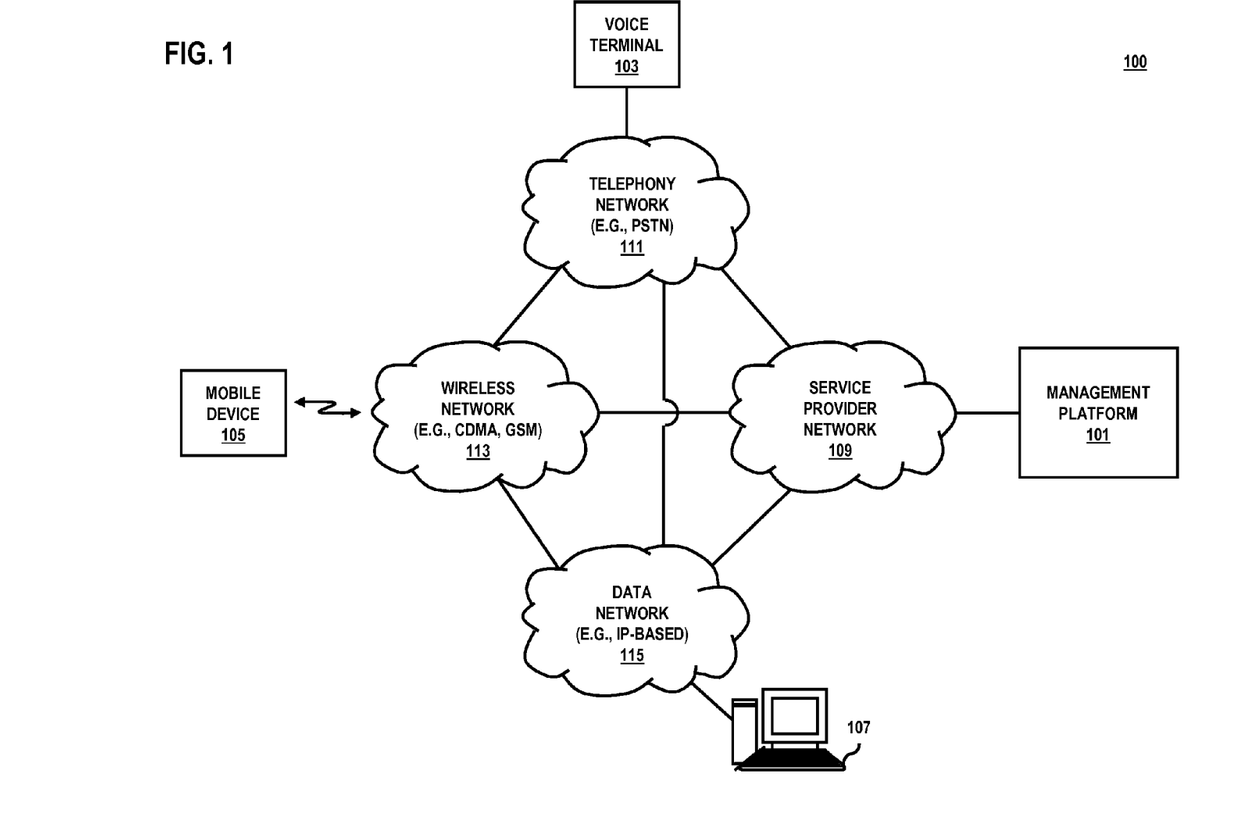
FIG. 1 is a diagram of a system capable of bypassing a video data stream of a communication data stream around an anchor point within a network, according to one embodiment.

FIG. 1 is a diagram of a system capable of bypassing a video data stream included within a communication data stream around an anchor point within a network, according to one embodiment. As discussed, communication service providers face significant technical challenges when anchoring media within a network and/or complying with certain legal requirements. Particularly for complying with CALEA, communication service providers face significant challenges in anchoring the large amounts of information associated with communication data streams at anchor points within the communication networks. As more advanced forms of communication are created, they have different requirements for the anchor points. A consideration is the processing capacity at the various anchor points; notably, as communication traffic increases, more capacity is needed, thereby entailing more costs. Indeed, traffic associated with communications that include video requires larger amounts of resources to handle the larger amounts of data. For example, where a typical audio call is only 100 kilobits per second, a high-definition video call can be 2 megabits per second. As video becomes more prevalent in communications, anchor points may become more strained in terms of processing capacity.

The approach of the system 100 stems, in part, from the recognition that communication session monitoring (e.g., under CALEA), often only the audio portion of a communication need to be anchored. Regarding CALEA, there is currently no requirement to anchor the video portion of the communication. By splitting or otherwise segregating a communication data stream (or media stream) into an audio data stream and a video data stream, and then anchoring only the audio data stream within the network, communication service providers can avoid the additional costs and resources associated with anchoring the entire communication data stream within the communication networks and still comply with CALEA.

As shown, the system 100 includes a management platform 101 implemented, for example, as part of the service provider network 109, which monitors communication data streams for candidate streams to split and bypassing the video component around anchor points. In certain embodiments, the communication data streams include voice over internet protocol (VOIP) reliable transport protocol (RTP) streams. In general, IP telephony, which is also referred to as VOIP, is the conversion of voice information into data packets that are transmitted over an IP network. Users, such as including enterprises, also have turned to IP telephony as a matter of convenience in that both voice, video, and data services are accessible through a single piece of equipment. The continual integration of voice, video, and data services further fuels this demand for IP telephony applications.

By way of example, the packetized voice session is established using Session Initiation Protocol (SIP). A detailed discussion of SIP and its call control services are described in Internet Engineering Task Force (IETF) Request for Comment (RFC) 2543, entitled "SIP: Session Initiation Protocol"; RFC 3515, entitled "The Session Initiation Protocol (SIP) Refer Method"; RFC 3261, entitled "SIP: Session Initiation Protocol"; and RFC 3725, entitled "Best Current Practices for Third Party Call Control (3pcc) in the Session Initiation Protocol (SIP)"; all of which are incorporated herein by reference in their entireties. SIP is used to create and terminate voice calls over a data network (e.g., network 103). However, it is understood that one of ordinary skill in the art would realize that the H.323 protocol and similar protocols can be utilized in lieu of SIP. The H.323 protocol, which is promulgated by the International Telecommunication Union (ITU), specifies a suite of protocols for multimedia communication. SIP is a signaling protocol that is based on a client-server model. It should be noted that both the H.323 protocol and SIP are not limited to IP telephony applications, but have applicability to multimedia services in general.

Since SIP can be used for signaling, a media session transported using schemes such as RTP (Real-time Transport Protocol)/UDP (User Datagram Protocol), RTP/TCP (Transmission Control Protocol), RTP/SCTP (Stream Control Transmission Protocol), and AAL (ATM Adaptation Layer)/ATM (Asynchronous Transfer Mode) among many others; this service allows calling between schemes in an efficient way.

Four possible scenarios exist with the placement of a VoIP call: (1) phone-to-phone, (2) phone-to-PC, (3) PC-to-phone, and (4) PC-to-PC. In the first scenario of phone-to-phone call establishment, voice station 103 is switched through PSTN 111 by a switch to a VOIP gateway (not shown), which forwards the call through the data (e.g., IP) network 115. The packetized voice call is then routed through the IP network 115, exiting the IP network 115 at an appropriate point to enter the PSTN 111 and terminates at mobile device 105. Under the second scenario, a voice station places a call to PC through a switch to the PSTN 111. This voice call is then switched by the PSTN 111 to a VOIP gateway (not shown), which forwards the voice call to a PC via the IP network 115. The third scenario involves a PC that places a call to a voice station. Using a voice encoder, the PC introduces a stream of voice packets into the IP network 115 that are destined for a VoIP gateway (not shown). The VoIP gateway (e.g., within the SIP provider network 109) converts the packetized voice information into a POTS (Plain Old Telephone Service) electrical signal, which is circuit switched to the voice station. Lastly, in the fourth scenario, a PC establishes a voice call with a PC; in this case, packetized voice data is transmitted from the PC via the IP network 115 to another PC, where the packetized voice data is decoded.

A detailed discussion of SIP and its call control services are described in IETF RFC 2543 and IETF Internet draft "SIP Call Control Services", Jun. 17, 1999; both of these documents are incorporated herein by reference in their entireties. SIP messages are either requests or responses. SIP defines a user agent client (UAC) or a user agent server (UAS), depending on the services that the system 100 is executing. In general, a user agent client issues requests, while a user agent server provides responses to these requests.

The service provider network 109 can interact with one or more other networks, such as a telephony network 111, a wireless network 113, and/or a data network 115. The anchor points may be located within any of the networks 109-115, such as within the service provider network 109 and/or the telephony network 111. Communications may be established between one or more devices, such as voice terminal 103, mobile device 105 and/or computing device 107. The communications may be any type of communication that includes audio data and video data, such as a VoIP voice call that include video. As such, the communication data stream may include a voice real-time transport protocol and a video real-time transport protocol. For purposes of illustrative convenience, only one voice terminal 103, mobile device 105 and computer device 107 are illustrated. However, the system 100 may include any number of voice terminals 103, mobile devices 105 and computing devices 107 that permit communications between endpoints.

For illustrative purposes, the networks 109-115 may be any suitable wireline and/or wireless network, and be managed by one or more service providers. For example, telephony network 111 may include a circuit-switched network, such as the public switched telephony network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 115 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions.

According to exemplary embodiments, end user devices (not shown) may be utilized to communicate over system 100 and may include any customer premise equipment (CPE) capable of sending and/or receiving information over one or more of networks 109-115. For instance, voice terminal 103 may be any suitable plain old telephone service (POTS) device, facsimile machine, etc., whereas mobile device 105 (or terminal) may be any cellular phone, radiophone, satellite phone, smart phone, wireless phone, or any other suitable mobile device 105, such as a personal digital assistant (PDA), pocket personal computer, tablet, customized hardware, etc. Further, computing device 107 may be any suitable computing device, such as a VoIP phone, skinny client control protocol (SCCP) phone, session initiation protocol (SIP) phone, IP phone, personal computer, softphone, workstation, terminal, server, etc.

Figure 2A:
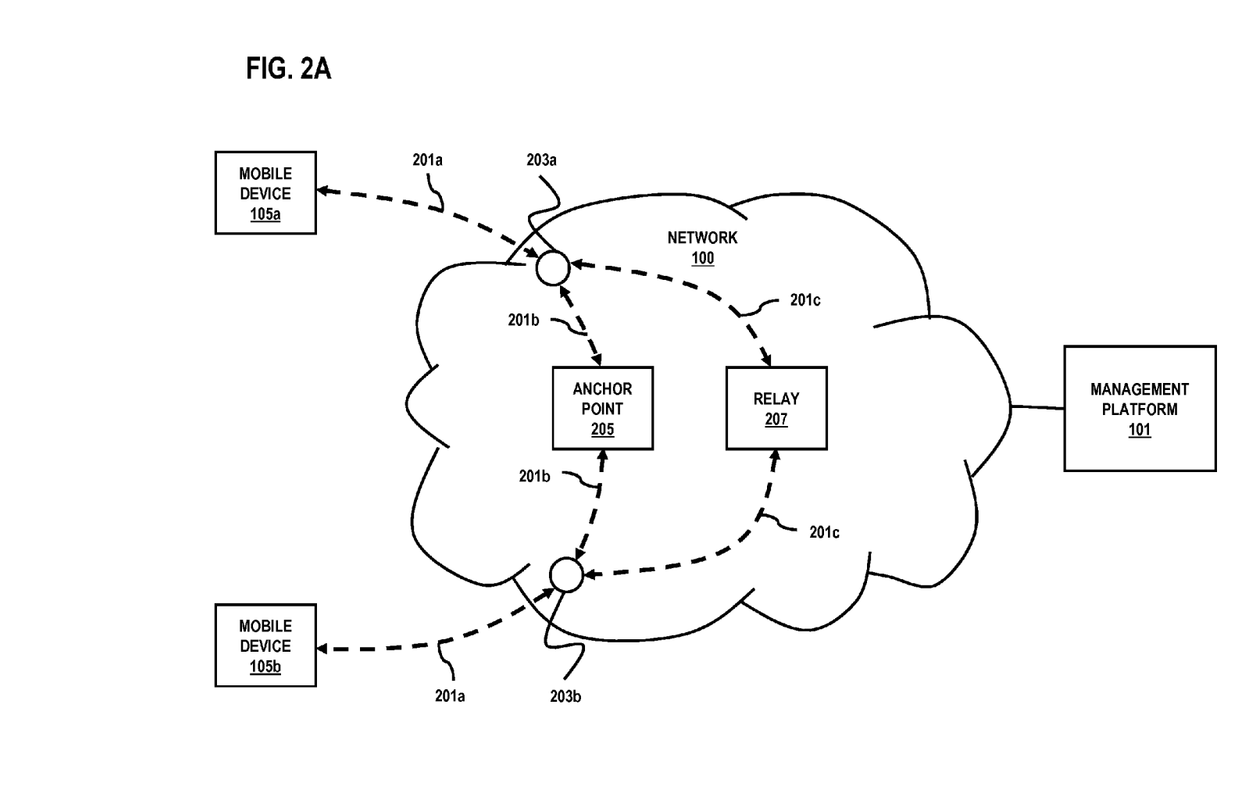
FIGS. 2A and 2B are diagrams of an anchor point and a relay within a network for bypassing a video data stream, according to various embodiments.
Figure 2B:
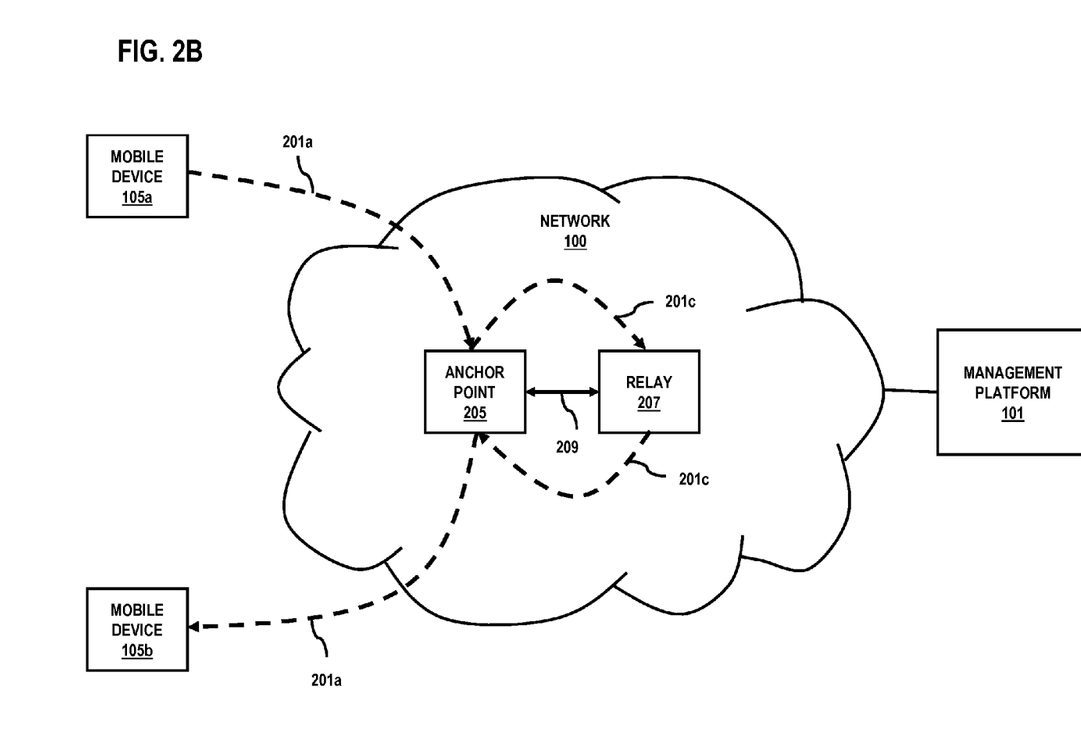

FIGS. 2A and 2B are diagrams of an anchor point and a relay within a network 100 for bypassing a video data stream, according to various embodiments. The network 100 supports the communication data streams between endpoints, e.g., mobile device 105a and 105b. As discussed, the network 100 may be any one or a combination of the networks 109-115. Although discussed with respect to a flow of the communication data stream 201a proceeding from mobile device 105a to mobile device 105b, it is to be understood that the flow occurs in both directions.

As illustrated in FIG. 2A, a communication session may be established between two endpoints, mobile device 105a and mobile device 105b. For purposes of explanation, the communication session may comprise a communication data stream 201a (e.g., VOIP/video RTP stream) that originates from mobile device 105a. Within the network 100, the communication data stream may reach a point 203a where the audio data stream (e.g., audio RTP stream) and the video data stream (e.g., video RTP stream) that constitute the communication data stream are split. The resulting audio data stream 201b is sent to an anchor point 205 within the network 100. By way of example, the anchor point 205 may constitute a session border controller (SBC), which is responsible for the signaling in establishing and tearing down the communication sessions—e.g., VOIP/video calls. The signaling involve SIP, H.323, and/or media gateway control protocol (MGCP). Details of MGCP are described in RFC 2805 and RFC 3435, which are incorporated herein in their entireties. MGCP employs SDP and RTP to specify and frame the media streams. By anchoring the audio data stream 201b at the anchor point 205, the communication service provider associated with the network 100 complies with the requirements of CALEA by allowing government agencies to intercept the anchored audio data stream 201b.

Further, the video data stream 201c bypasses the anchor point 205 to avoid the additional, unnecessary processing load of the video data stream 201c at the anchor point 205. Rather, the video data stream 201c is sent to, for example, a relay 207. The relay 207 may be any type of device that can handle the bypassing of the video data stream, such as a router or a fast packet processor. After the anchor point 205 and the relay 207, the audio data stream 201b and the video data stream 201c are merged back into the communication data stream 201a at point 203b and sent to the mobile device 105b. Based on the foregoing, the communication data stream 201a may be intercepted such that an audio data stream 201b from within the communication data stream 201a may be intercepted to satisfy the requirements of CALEA while bypassing the video data stream 201c around the anchor point 205 to reduce the processing load on the anchor point 205.

In one embodiment, the anchor point 205 and the relay 207 share a control channel 209. Because the speed of the audio data stream 201b passing through the anchor point 205 might vary because of the processing load on the anchor point 205, the control channel 209 allows the anchor point 205 to communicate with the relay 207. The relay 207 can then receive information regarding the processing load from the anchor point 205 and slow down the processing of the video data stream 201b to minimize synchronization issues between the audio data stream 201b and the video data stream 201c at the merge point 203b. In one embodiment, the anchor point 205 and the relay 207 may not include a control channel 209 (as illustrated in FIG. 2A). Rather, control communications between the anchor point 205 and the relay 207 may be achieved through the management platform 101, where the management platform 101 is a separate element associated with the network.

FIG. 2B illustrates a similar configuration as the configuration the illustrated in FIG. 2A. However, in one embodiment, the anchor point 205 may act as the split point 203a and the merge point 203b. When the communication data stream 201a splits into the audio data stream 201b and the video data stream 201c, the issue of synchronizing the data streams when they are merged back (or mated) into the communication data stream 201a downstream from the anchor point 205 arises. Having the communication data stream 201a split and merged as close to, or at, the anchor point 205 as possible reduces the complexity of synchronizing the two streams during the merging process. Accordingly, as illustrated in FIG. 2B, the communication data stream 201a may reach the anchor point 205 prior to any splitting. The anchor point 205 then splits the communication data stream 201a into the audio data stream 201b and the video data stream 201c. The audio data stream 201b remains anchored at the anchor point 205. However, the video data stream 201c bypasses the anchoring at the anchor point 205 and is instead sent to the relay 207. After passing through the relay 207, the video data stream 201c is then merged back with the audio data stream 201b at the anchor point 205 and transmitted to the mobile device 105b.

Figure 3:
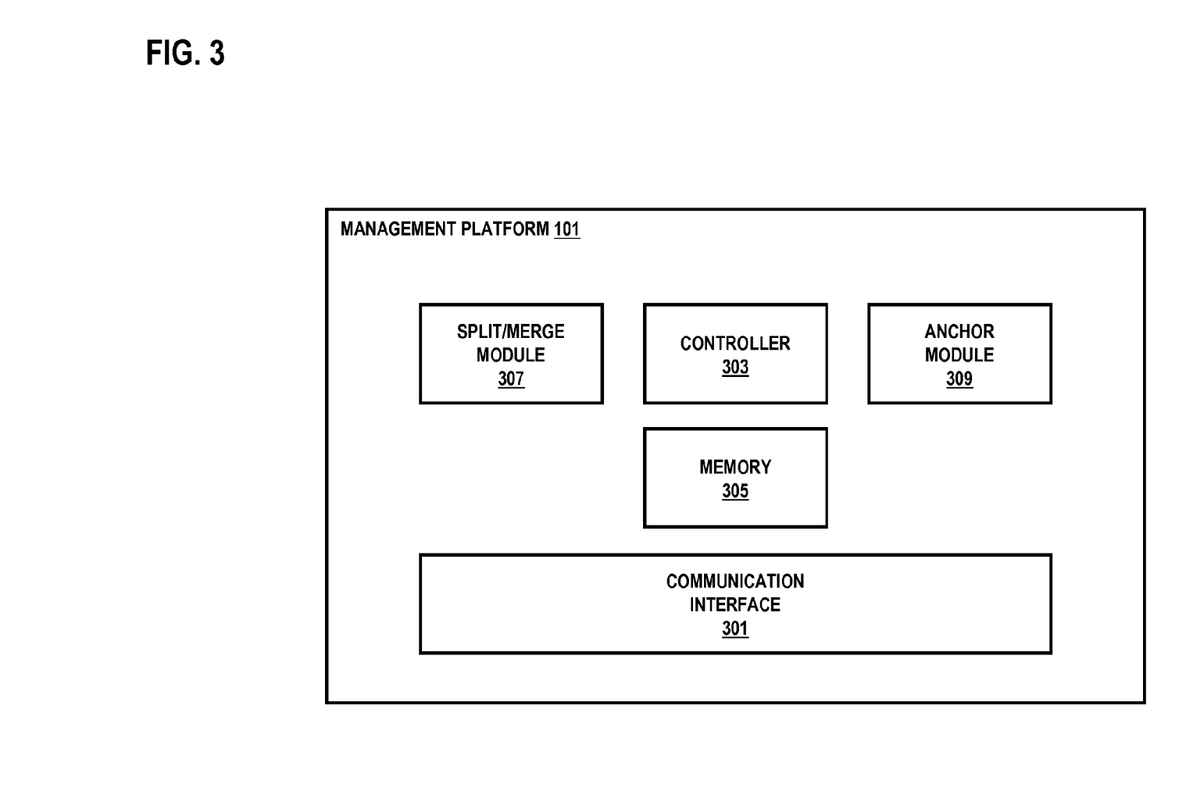
FIG. 3 is a diagram of a management platform capable of bypassing a video data stream around an anchor point in a network, according to one embodiment.

FIG. 3 is a diagram of the components of a management platform 101, according to one embodiment. The management platform 101 may comprise computing hardware (such as described with respect to FIG. 7), as well as include one or more components configured to execute the processes described herein for bypassing a video data stream around an anchor point. It is contemplated that the functions of these components may be combined in one or more components or performed by other components of equivalent functionality. In one embodiment, the functions and/or components of the management platform 101 may be embodied by the anchor point within the network. By way of example, the functions and or components of the management platform 101 may be incorporated into existing session border controllers. In one implementation, the management platform 101 includes a communication interface 301, a controller (or processor) 303, memory 305, a split/merge module 307, and an anchor module 309.

The controller 303 may execute one or more algorithms for executing functions of the management platform 101. The controller 303 may interact with the memory 305 in executing the one or more algorithms, such as obtaining one or more lines of code from the memory 305 and/or temporarily storing information within the memory 305. Further, the controller 303 may interact with the split/merge module 307 to determine communication data streams to split and audio and video data streams to merge. The split/merge module 307 may track the number of communications occurring over a communication network of a service provider and provide functionality associated with the splitting and merging of the communication data stream. In one embodiment, where one or more separate elements of a network perform the splitting and/or merging of the communication data stream, the split/merge module 307 may direct the functionality of the one or more elements to split and merge the data streams.

The controller 303 may execute one or more algorithms associated with interacting with the anchor module 309 to perform anchoring of one or more audio data streams at one or more anchor points within a network. The controller 303 may further execute one or more algorithms associated with interacting with the anchor module 309 to perform bypassing of one or more video streams around an anchor point within a network. When the management platform 101 is not embodied in an anchor point (such as a SBC), the management platform 101 through the anchor module 309 may direct the anchor point regarding what audio data streams to process and what video data streams to bypass around the anchor point.

The controller 303 may further utilize the communication interface 311 to communicate with other components of the management platform 101, the voice terminal 103, the mobiles device 105, and the computing devices 107, or any other components of the system 100. The communication interface 311 may include multiple means of communication. For example, the communication interface 311 may be able to communicate over short message service (SMS), multimedia messaging service (MMS), Internet Protocol (IP), instant messaging (IM), voice sessions (e.g., via a phone network), email, or other types of communication.

Figure 4:
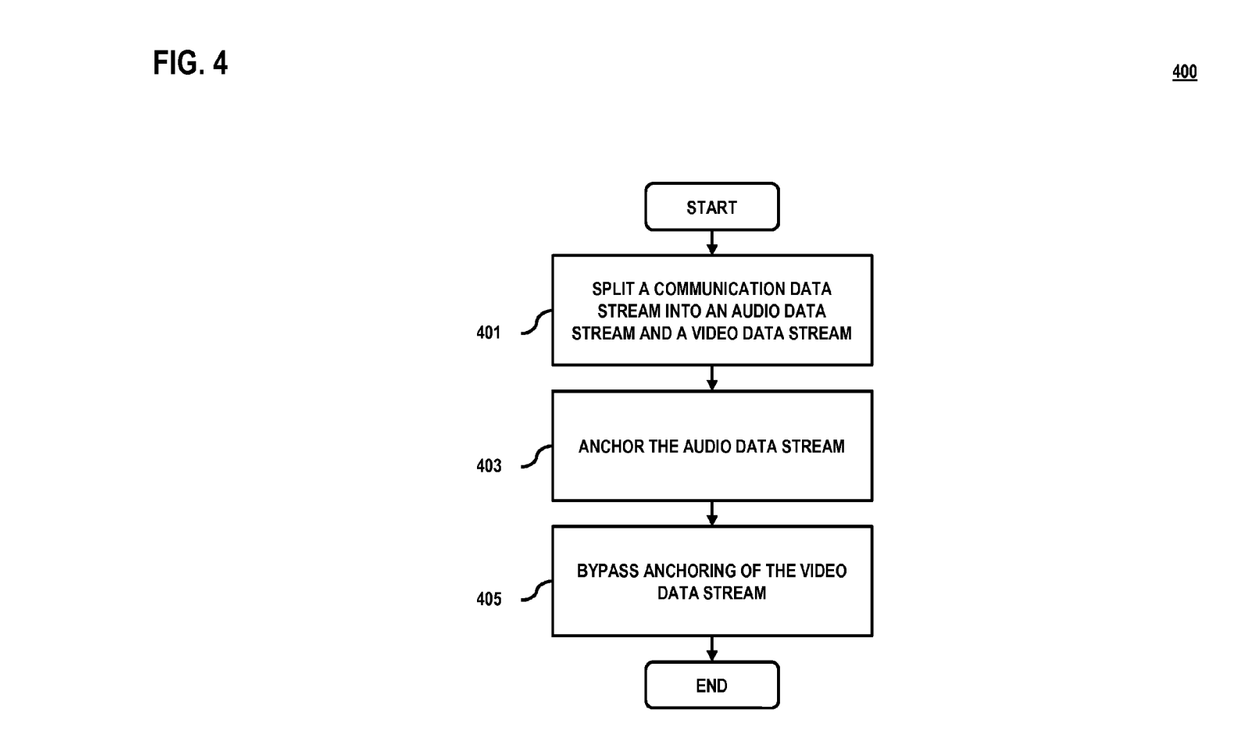
FIG. 4 is a flowchart of a process for bypassing a video data stream around an anchor point in a network, according to one embodiment.
Figure 7:
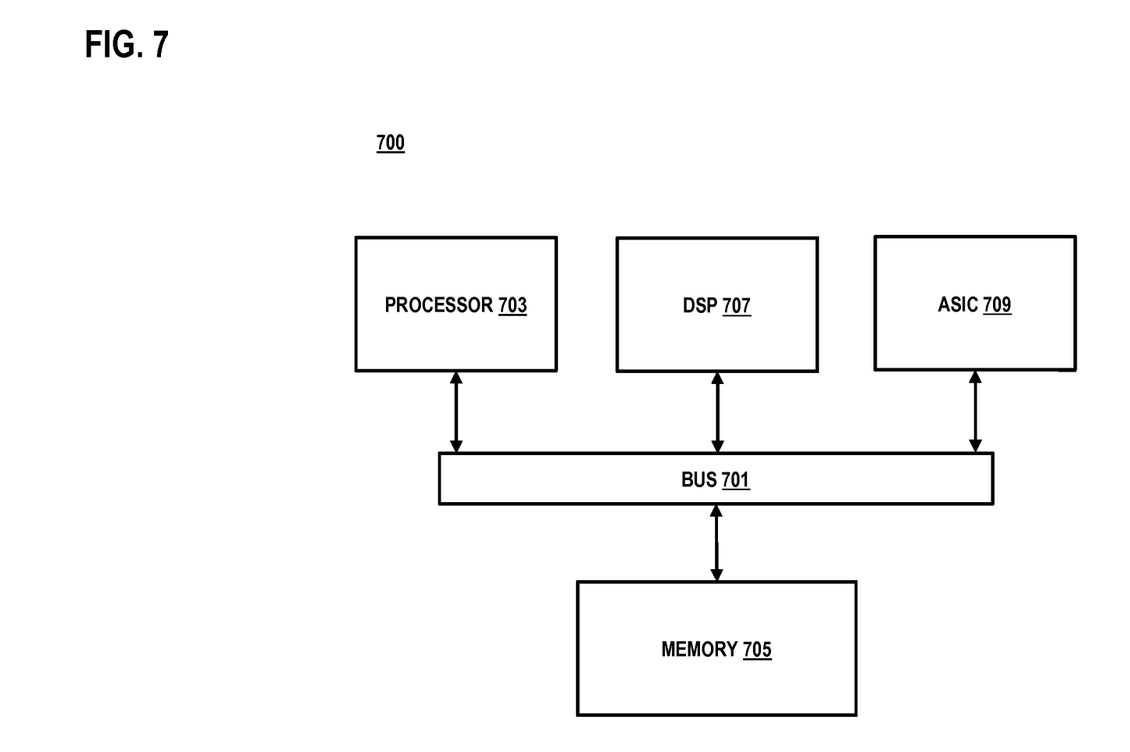
FIG. 7 is a diagram of a chip set that can be used to implement various exemplary embodiments.

FIG. 4 is a flowchart of a process 400 for bypassing a video data stream around an anchor point in a network, according to one embodiment. In one embodiment, the management platform 101 performs the process 400 and is implemented in, for instance, a chip set including a processor and a memory as shown in FIG. 7. For purposes of explanation, the process 400 will be described with respect to a management platform 101 embodied within an anchor point of the network. However, the management platform 101 may instead be a separate element of the network that instructs other elements of the network to perform the following steps.

In step 401, the management platform 101 splits a communication data stream into an audio data stream and a video data stream. The management platform 101 may receive a notice of the establishment of a communication data stream between endpoints associated with a service provider within a network (e.g., any one or more of networks 109-115). Upon receiving the notice, the management platform 101 may split the communication data stream. Splitting of the communication data stream may be accomplished according to any known process for splitting a data stream that includes both audio data packets and video data packets into respective data streams. By way of example, a communication data stream may include an audio real-time transport protocol (audio RTP) and a video real-time transport protocol (video RTP). The splitting of the communication data stream may include splitting the audio RTP from the video RTP. The splitting may occur anywhere within the network. In one embodiment, the splitting of the communication data stream occurs at the anchor point within the network.

After splitting the communication data stream, in step 403, the management platform 101 anchors the audio data stream at the anchor point within the network. The anchor point may be, for example, a session border controller (SBC) that is CALEA compliant. The anchor point may then provide the necessary processing associated with providing the ability to intercept the audio data stream of the communication data stream to comply with the requirements of CALEA.

In step 405, the management platform 101 bypasses anchoring of the video data stream at the anchor point within the network to reduce the processing load at the anchor point. Accordingly, rather than the anchor point processing the entire communication data stream, the anchor point only processes the audio data stream and the video data stream is sent to another element of the network to bypass the anchor point. Where, for example, the audio data stream includes information transmitted at 100 kbps and the video data stream includes information transmitted at 2 Mbps, bypassing the video data stream around the anchor point reduces the processing of information upwards of 95% at the anchor point, thus reducing the related costs and resources associated with the anchor point to satisfy the requirements of CALEA.

Figure 5:
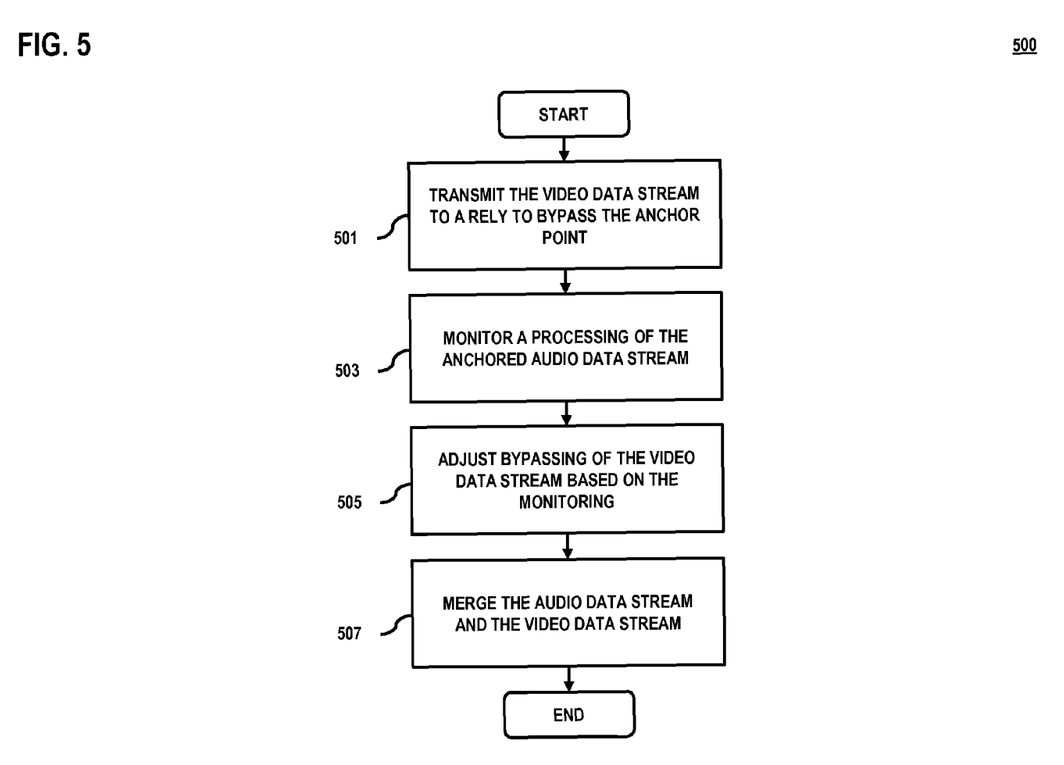
FIG. 5 is a flowchart of a process for merging an audio data stream and a video data stream, according to one embodiment.

FIG. 5 is a flowchart of a process 500 for merging an audio data stream and a video data stream after having anchored the audio data stream and bypassing the anchoring with the video data stream, according to one embodiment. In one embodiment, the management platform 101 performs the process 500 and is implemented in, for instance, a chip set including a processor and a memory as shown in FIG. 7. For purposes of explanation, the process 500 will be described with respect to a management platform 101 embodied within an anchor point of the network. However, the management platform 101 may instead be a separate element of the network that instructs other elements of the network to perform the following steps.

In step 501, the management platform 101 transmits the video data stream, which was part of a communication data stream, to a relay to bypass the video data stream around the anchor point. Thus, while the anchor point processes the audio data stream, the video data stream is sent to the relay to avoid the anchor point processing the video data stream. The relay may be any type of device that can process the video data stream to control the transmission speed of the video data stream. By way of example, the relay could be a router or a fast packet processor. In one embodiment, the relay can be a modified session border controller with the sole function of controlling the timing of a video data stream.

In step 503, the management platform 101 monitors a processing of the anchored audio data stream. The monitoring determines the speed that the audio data stream is processed by the anchor point. As the load on the anchor point increases (e.g., as the number of audio data streams increases, the bandwidth of audio data streams increase, etc.), the processing speed of the audio data stream may decrease. The management platform 101 monitors for the change in the processing to coordinate the merging of the audio data stream at a later point in time with the video data stream.

In step 505, the management platform 101 adjusts the bypassing of the video data stream based on the monitoring to synchronize the audio data stream and the video data stream. The management platform 101 may adjust the speed of the processing at the relay of the video data stream to either increase or decrease the speed of the processing to correspond with the speed of the processing of the audio data stream. The adjustment allows for, at least in part, the synchronization of the video data stream with the audio data stream to ensure that the resulting communication data stream is properly synchronized.

Subsequently, in step 507, the management platform 101 merges the audio data stream and the video data stream downstream from the anchor to re-create the original communication data stream. The merged communication data stream appears identical or approximately identical in form to the original communication such that the endpoints are unable to determine that the audio data stream was anchored within the network while the video data stream was not.

The processes described herein for video data stream bypassing may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
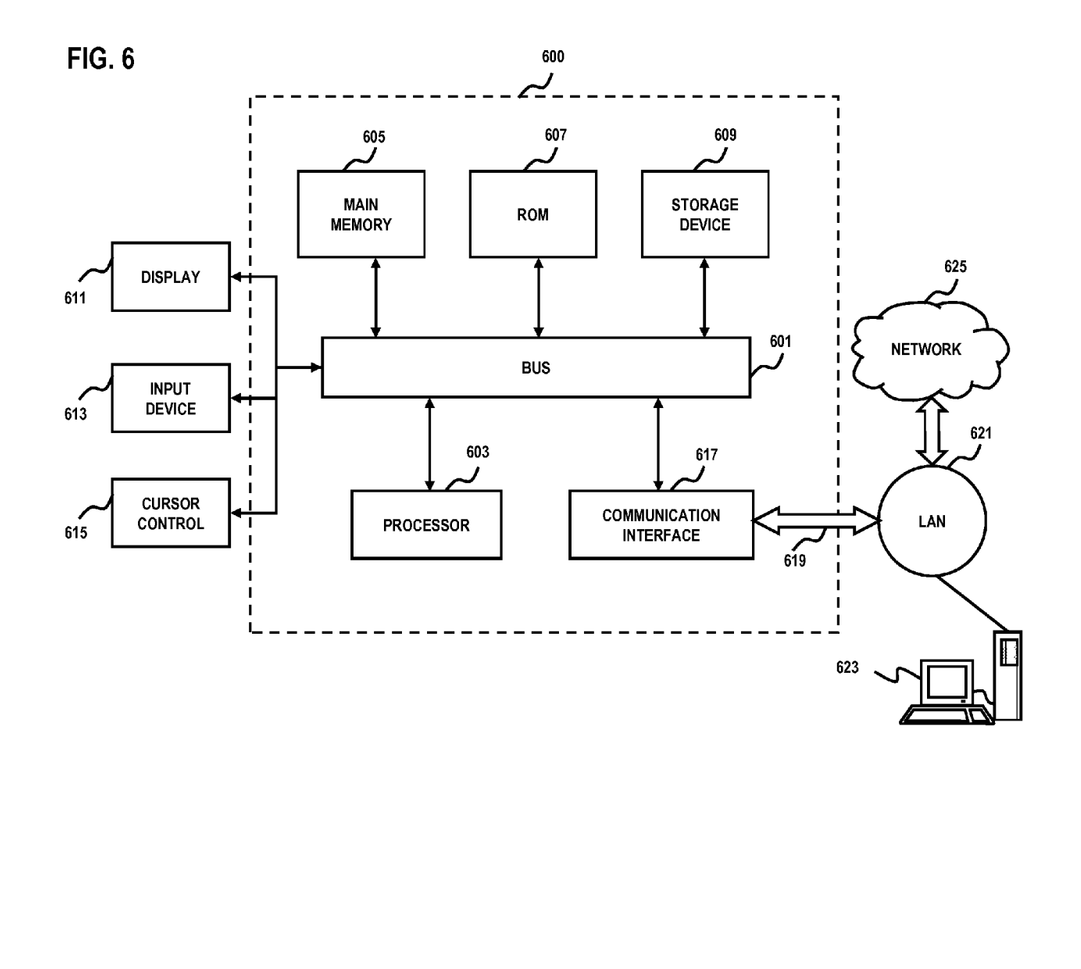
FIG. 6 is a diagram of a computer system that can be used to implement various exemplary embodiments.

FIG. 6 illustrates computing hardware (e.g., computer system) upon which an embodiment according to the invention can be implemented. The computer system 600 includes a bus 601 or other communication mechanism for communicating information and a processor 603 coupled to the bus 601 for processing information. The computer system 600 also includes main memory 605, such as random access memory (RAM) or other dynamic storage device, coupled to the bus 601 for storing information and instructions to be executed by the processor 603. Main memory 605 also can be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device

613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multiprocessing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set 700 upon which an embodiment of the invention may be implemented. Chip set 700 is programmed to present a slideshow as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of FIGS. 4 and 5.

In one embodiment, the chip set 700 includes a communication mechanism such as a bus 701 for passing information among the components of the chip set 700. A processor 703 has connectivity to the bus 701 to execute instructions and process information stored in, for example, a memory 705.

The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   splitting a communication data stream transmitted between communicating parties into an audio data stream and a video data stream;
   anchoring the audio data stream at an anchor point within a network;
   in response to a request from a third party that is different from the communicating parties, intercepting the audio data stream at the anchor point; and
   bypassing anchoring of the video data stream at the anchor point within the network to reduce a processing load at the anchor point.

2. A method according to claim 1, further comprising:
   merging the audio data stream and the video data stream into the communication data stream; and
   selectively monitoring the intercepted audio data stream to enforce law.

3. A method of claim 2, further comprising:
   determining a splitting point for the splitting and a merging point for the merging within the network to minimize a distance between the splitting point and the merging point,
   wherein the anchor point is a session border controller.

4. A method according to claim 3, wherein the anchor point acts as the merging point, or the anchor point acts as the splitting point and the merging point.

5. A method according to claim 1, further comprising:
   transmitting the video data stream to a relay to bypass the anchor point.

6. A method according to claim 5, wherein the relay is a router or a fast packet processor.

7. A method according to claim 1, further comprising:
   merging the audio data stream and the video data stream downstream from the anchor point.

8. A method according to claim 7, further comprising:
   monitoring a processing of the anchored audio data stream; and
   adjusting the bypassing of the video data stream based on the monitoring to synchronize the audio data stream and the video data stream during the merging.

9. An apparatus comprising:
   a processor configured to split a communication data stream transmitted between communicating parties into an audio data stream and a video data stream, anchor the audio data stream at an anchor point within a network, in response to a request from a third party that is different from the communicating parties, intercept the audio data stream at the anchor point; and cause the video data stream to bypass the anchor point within the network to reduce a processing load at the anchor point.

10. An apparatus according to claim 9, wherein the processor is further configured to transmit the video data stream to a relay to bypass the anchor point.

11. An apparatus according to claim 10, wherein the relay is a router or a fast packet processor.

12. An apparatus according to claim 9, wherein the processor is further configured to merge the audio data stream and the video data stream downstream from the anchor point.

13. An apparatus according to claim 12, wherein the processor is further configured to:
    monitor a processing of the anchored audio data stream; and
    adjust the bypassing of the video data stream based on the monitoring to synchronize the audio data stream and the video data stream during the merging.

14. An apparatus according to claim 9, wherein the apparatus is a session border controller.

15. A system comprising:
    a splitting platform; and
    an anchor point within a network,
    wherein the splitting platform is configured to split a communication data stream transmitted between communicating parties into an audio data stream and a video data stream, anchor the audio data stream at the anchor point, in response to a request from a third party that is different from the communicating parties, intercept the audio data stream at the anchor point, and bypass the video data stream around the anchor point within the network.

16. A system according to claim 15, wherein the splitting platform is integrated within the anchor point and the splitting platform is further configured to split the communication data stream at the anchor point.

17. A system according to claim 16, wherein the anchor point is a session border controller.

18. A system according to claim 15, wherein the splitting platform is further configured to transmit the video data stream to a relay to bypass the anchor point.

19. A system according to claim 18, wherein the relay is a router or a fast packet processor.

20. A system according to claim 15, wherein the splitting platform is further configured to merge the audio data stream and the video data stream downstream from the anchor point.

* * * * *